(12) United States Patent
Kim et al.

(10) Patent No.: US 12,379,269 B2
(45) Date of Patent: Aug. 5, 2025

(54) PRESSURE MEASURING UNIT AND BATTERY INSPECTION DEVICE

(71) Applicant: LG ENERGY SOLUTION, LTD., Seoul (KR)

(72) Inventors: Do-Yul Kim, Daejeon (KR); Dong-Wan Ko, Daejeon (KR); Ki-Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 263 days.

(21) Appl. No.: 17/792,033

(22) PCT Filed: Jun. 23, 2021

(86) PCT No.: PCT/KR2021/007911
§ 371 (c)(1),
(2) Date: Jul. 11, 2022

(87) PCT Pub. No.: WO2022/025440
PCT Pub. Date: Feb. 3, 2022

(65) Prior Publication Data
US 2023/0049302 A1 Feb. 16, 2023

(30) Foreign Application Priority Data
Jul. 27, 2020 (KR) .......................... 10-2020-0093345

(51) Int. Cl.
*G01L 5/00* (2006.01)
*G01L 1/00* (2006.01)
(Continued)

(52) U.S. Cl.
CPC ................ *G01L 5/00* (2013.01); *G01L 1/005* (2013.01); *G01L 1/26* (2013.01); *H01M 10/4285* (2013.01)

(58) Field of Classification Search
CPC .. G01L 5/00; G01L 1/26; G01L 1/005; H01M 10/4285
See application file for complete search history.

(56) References Cited

U.S. PATENT DOCUMENTS

| | | |
|---|---|---|
| 10,407,838 B1 | 9/2019 | Sylvester |
| 2008/0042797 A1* | 2/2008 | Nakasone ................. G01L 1/26 338/5 |

(Continued)

FOREIGN PATENT DOCUMENTS

| | | |
|---|---|---|
| CN | 108369467 A | 8/2018 |
| CN | 108878698 A | 11/2018 |

(Continued)

OTHER PUBLICATIONS

International Search Report for PCT/KR2021/007911 mailed on Oct. 22, 2021.

(Continued)

*Primary Examiner* — Paul M. West
(74) *Attorney, Agent, or Firm* — Birch, Stewart, Kolasch & Birch, LLP

(57) ABSTRACT

A pressure measuring unit including: a body part configured to have an upper surface, a lower surface, and a plurality of side surfaces; a connector part configured to be provided to at least one side surface among the plurality of side surfaces of the body part; a pressure measuring part coupled to the upper surface of the body part and configured to measure a pressure applied toward the upper surface of the body part from the outside to generate a pressure value; and a control part connected to the pressure measuring part to receive the measured pressure value from the pressure measuring part and configured to output the received pressure value to a communication line connected thereto.

16 Claims, 12 Drawing Sheets

(51) Int. Cl.
*G01L 1/26* (2006.01)
*H01M 10/42* (2006.01)

(56) References Cited

U.S. PATENT DOCUMENTS

| | | | |
|---|---|---|---|
| 2012/0198941 A1* | 8/2012 | Smith | F16B 37/0857 |
| | | | 73/761 |
| 2013/0143435 A1* | 6/2013 | Kim | H01R 13/73 |
| | | | 439/527 |
| 2013/0298688 A1* | 11/2013 | Wade | G01L 1/18 |
| | | | 73/766 |
| 2014/0107949 A1 | 4/2014 | Arnold et al. | |
| 2014/0245841 A1* | 9/2014 | Wittig | G01L 1/26 |
| | | | 73/862.68 |
| 2015/0047439 A1* | 2/2015 | Ogawa | G01L 1/2206 |
| | | | 73/862.621 |
| 2016/0204293 A1 | 7/2016 | Nakai et al. | |
| 2017/0249271 A1* | 8/2017 | Gagne-Keats | H04M 1/72409 |
| 2018/0261824 A1 | 9/2018 | Ju et al. | |
| 2019/0094003 A1 | 3/2019 | Kim et al. | |
| 2019/0352860 A1 | 11/2019 | Sylvester | |
| 2020/0158596 A1 | 5/2020 | Kim et al. | |
| 2021/0046472 A1 | 2/2021 | Lee et al. | |
| 2021/0197691 A1 | 7/2021 | Stefanopoulou et al. | |

FOREIGN PATENT DOCUMENTS

| | | |
|---|---|---|
| DE | 10 2013 015 700 A1 | 3/2015 |
| EP | 3 621 128 A1 | 3/2020 |
| JP | 60-209131 A | 10/1985 |
| JP | 4-130047 U | 11/1992 |
| JP | 2010-102928 A | 5/2010 |
| JP | 2014-185858 A | 10/2014 |
| JP | 2019-522881 A | 8/2019 |
| KR | 10-1290559 B1 | 7/2013 |
| KR | 10-2015-0054372 A | 5/2015 |
| KR | 10-1660443 B1 | 9/2016 |
| KR | 10-2017-0042082 A | 4/2017 |
| KR | 10-2018-0099668 A | 9/2018 |
| KR | 10-2018-0103591 A | 9/2018 |
| KR | 10-2018-0136192 A | 12/2018 |
| KR | 10-1983849 B1 | 9/2019 |
| KR | 10-2020-0012752 A | 2/2020 |
| WO | WO2018/205598 A1 | 11/2018 |

OTHER PUBLICATIONS

Extended European Search Report for European Application No. 21849976.2, dated Jul. 22, 2024.

\* cited by examiner

PRESSURE MEASURING UNIT AND BATTERY INSPECTION DEVICE

TECHNICAL FIELD

The present application claims priority to Korean Patent Application No. 10-2020-0093345 filed on Jul. 27, 2020 in the Republic of Korea, the disclosures of which are incorporated herein by reference.

The present disclosure relates to a pressure measuring unit and a battery inspection device, and more particularly, to pressure measuring units detachably attached to each other and a battery inspection device including the same.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Such a battery may cause swelling due to the generation of gas therein during charging and discharging or at high temperature. Since there is a risk of fire or explosion due to swelling of the battery, it is important to accurately examine the swelling behavior of the battery.

Conventionally, a device for inspecting the swelling of a battery using a plurality of load cells has been disclosed (Patent Literature 1). Referring to Patent Literature 1, a first plate, a plurality of load cells, a second plate, a measurement target (a battery cell), and a third plate are stacked, and the first plate, the second plate and the third plate are fixed through a plurality of fastening members. In particular, since the second plate provided between the battery cell and the plurality of load cells is fixed by the fastening member, when the swelling pressure of each part of the battery cell is transmitted to the plurality of load cells, a lot of loss is inevitably generated. That is, Patent Literature 1 has a limitation in not being able to accurately inspect the swelling of the battery cell because the movement of the second plate according to the swelling pressure is restricted by the fastening member.

Also, referring to FIG. 9 of Patent Literature 1, a structure is disclosed in which the second plate is composed of a plurality of partial plates, which are connected to each other by a connection portion. Since the partial plates are connected to each other, there is a problem that the swelling pressure applied to one partial plate may affect other partial plates.

In addition, the plurality of partial plates of Patent Literature 1 are constrained to each other by the connection portion formed of a material having elasticity or ductility. That is, when swelling pressure is applied to any one partial plate, this swelling pressure is not transmitted only toward the load cell positioned in the lower direction thereof, but there is a problem that swelling pressure is dispersed through the connection portion.

Considering the above, there is a problem that the pressure of the battery cell measured by the battery cell pressure measuring device disclosed in Patent Literature 1 may be inaccurate.

(Patent Literature 1) KR 10-2017-0042082 A

DISCLOSURE

Technical Problem

The present disclosure is designed to solve the problems of the related art, and therefore the present disclosure is directed to providing pressure measuring units detachably attached to each other, and a battery inspection device including a plurality of such pressure measuring units to inspect the swelling of a battery in various aspects.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A pressure measuring unit according to an aspect of the present disclosure may include: a body part configured to have an upper surface, a lower surface, and a plurality of side surfaces; a connector part configured to be provided to at least one side surface among the plurality of side surfaces of the body part; a pressure measuring part coupled to the upper surface of the body part and configured to measure a pressure applied toward the upper surface of the body part from the outside to generate a pressure value; and a control part connected to the pressure measuring part to receive the measured pressure value from the pressure measuring part and configured to output the received pressure value to a communication line connected thereto.

The connector part may be configured to include: a power terminal configured to be connected to a power line through which a current supplied to the pressure measuring part and the control part flows; and a communication terminal configured to be connected to the communication line.

The connector part may be provided to each of the plurality of side surfaces of the body part, power terminals respectively included in the connector parts may be connected to each other through the power line, and communication terminals respectively included in the connector parts may be connected to each other through the communication line.

The control part may be configured to output the pressure value to the communication line together with a pre-allocated identification number.

A battery inspection device according to another aspect of the present disclosure may comprise: the pressure measuring unit according to an aspect of the present disclosure; a lower plate configured in a plate shape; an upper plate configured in a plate shape and configured to be positioned to face the lower plate; and a fixing frame configured such that a portion of the upper plate and a portion of the lower plate are fixedly coupled thereto.

The pressure measuring unit may be provided in plurality to an upper surface of the lower plate and include the pressure measuring part whose upper surface is configured in a plate shape such that a battery is seated on the plurality of pressure measuring units, and the pressure measuring unit may be configured to measure a unit pressure value applied toward the lower plate.

The plurality of pressure measuring units may be configured such that the connector parts of the plurality of pressure measuring units corresponding to each other are connected to each other.

The plurality of pressure measuring units may further include coupling parts installed at the plurality of side surfaces of the body part and configured to be detachably attached to each other.

The plurality of pressure measuring units may respectively include the connector part and the body part configured in a cuboid shape to include the coupling part at each of the plurality of side surfaces thereof, the plurality of pressure measuring units may be configured such that the pressure measuring units corresponding to each other are detachably attached through the coupling part, and the plurality of pressure measuring units may be configured such that the connector parts of the pressure measuring units corresponding to each other are connected to each other.

A battery inspection device according to still another aspect of the present disclosure may further include a processor connected to the communication line and configured to receive a plurality of unit pressure values respectively measured by the plurality of pressure measuring units through the communication line and determine at least one of a pressure distribution of the battery and a pressure size of each portion of the battery based on the plurality of received unit pressure values.

A battery inspection device according to still another aspect of the present disclosure may further include a pressure sensor positioned below the lower plate and configured to measure a battery pressure value applied toward the lower plate from the battery.

When the sum of the plurality of unit pressure values received from the plurality of pressure measuring units is different from the battery pressure value, the processor may be configured to correct each of the plurality of unit pressure values based on the battery pressure value.

A battery manufacturing apparatus according to still another aspect of the present disclosure may include the pressure measuring unit according to an aspect of the present disclosure.

Advantageous Effects

The pressure measuring unit according to one aspect of the present disclosure may be regarded as a unit module for measuring the pressure applied from the outside. Therefore, since a plurality of pressure measuring units may be combined with each other to form one pressure measuring device (e.g., a pressure measuring pad), the pressure measuring unit according to an embodiment of the present disclosure is has an advantage of providing excellent scalability.

In addition, the battery inspection device according to another aspect of the present disclosure has an advantage of diagnosing the battery swelling in various aspects by determining the pressure distribution of the battery and the pressure size of each portion.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control part" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
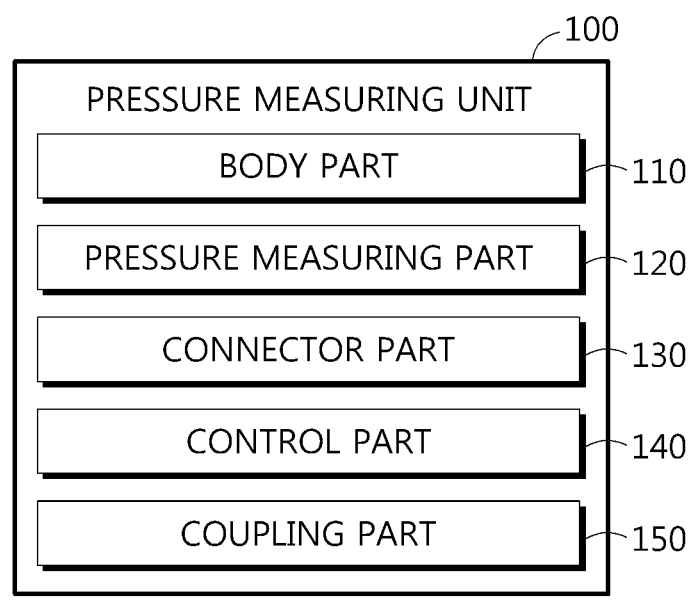
FIG. 1 is a diagram schematically showing a pressure measuring unit according to an embodiment of the present disclosure.
Figure 2:
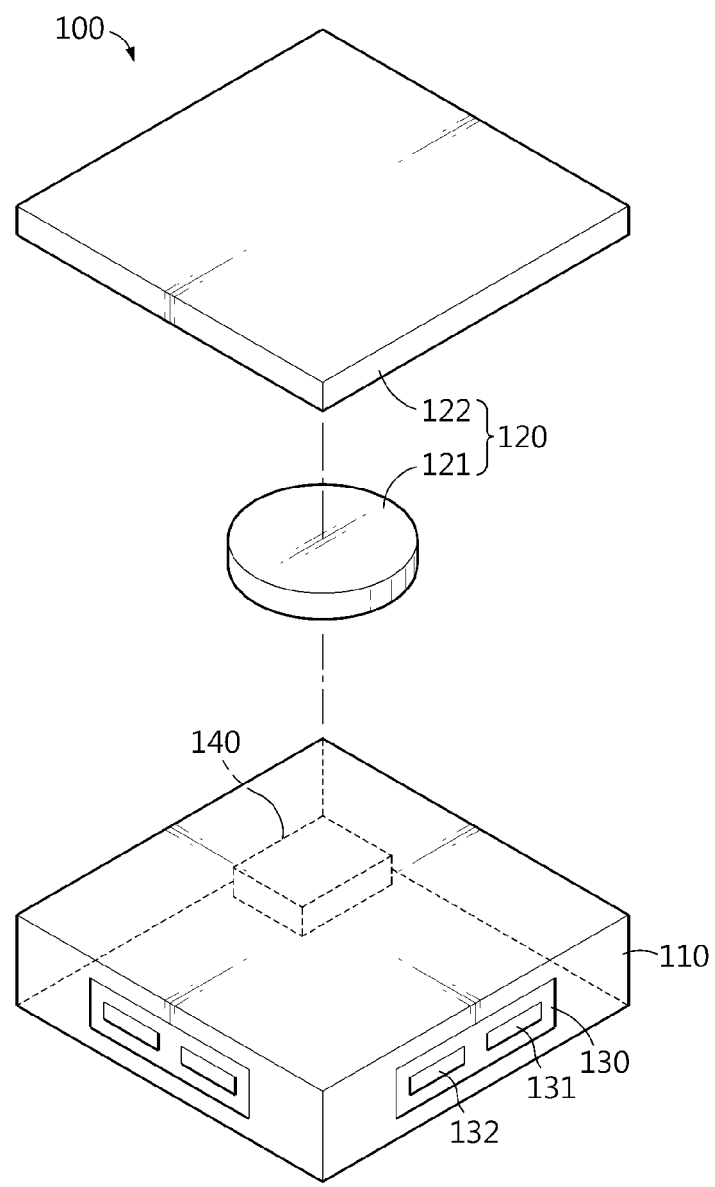
FIG. 2 is an exploded perspective view showing the pressure measuring unit according to an embodiment of the present disclosure.
Figure 3:
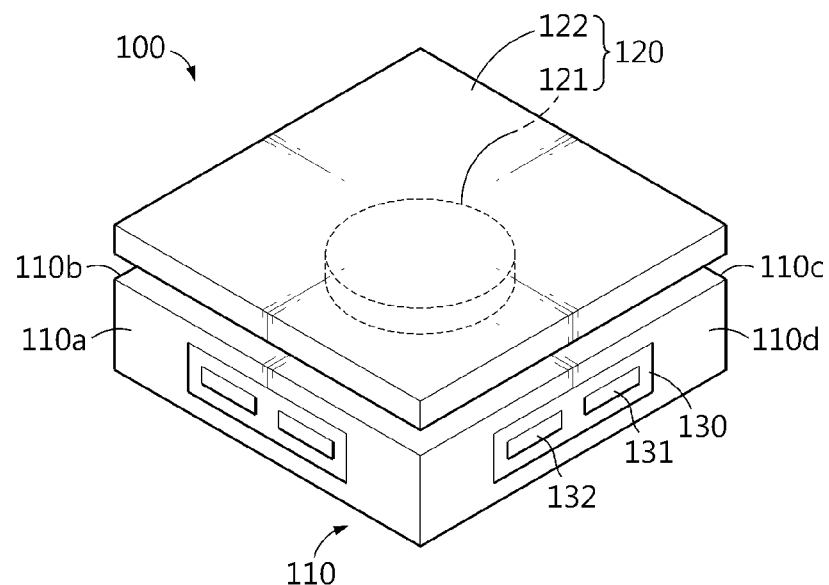
FIG. 3 is a coupled perspective view showing the pressure measuring unit according to an embodiment of the present disclosure.

FIG. 1 is a diagram schematically showing a pressure measuring unit 100 according to an embodiment of the present disclosure. FIG. 2 is an exploded perspective view showing the pressure measuring unit 100 according to an embodiment of the present disclosure. FIG. 3 is a coupled perspective view showing the pressure measuring unit 100 according to an embodiment of the present disclosure.

Referring to FIG. 1, the pressure measuring unit 100 according to an embodiment of the present disclosure may include a body part 110, a pressure measuring part 120, a connector part 130 and a control part 140.

The body part 110 may be configured to have an upper surface, a lower surface, and a plurality of side surfaces.

Specifically, the body part 110 may be configured in a polyhedral shape having an upper surface, a lower surface, and a plurality of side surfaces. For example, the body part 110 may be a polyhedron having at least five faces.

In the embodiment of FIGS. 2 and 3, the body part 110 may be configured in a hexahedral shape. Here, the body part 110 may have one upper surface, one lower surface, and four side surfaces 110a, 110b, 110c, 110d. Specifically, the body part 110 may have a first side surface 110a, a second side surface 110b, a third side surface 110c, and a fourth side surface 110d.

The connector part 130 may be configured to be provided to at least one side surface among the plurality of side surfaces of the body part 110.

Specifically, the connector part 130 may be provided to at least one side surface of the body part 110. Preferably, the connector part 130 may be provided to each of the plurality of side surfaces of the body part 110. In addition, the connector part 130 may include a communication terminal 131 to which a communication line CL is connected and a power terminal 132 to which a power line PL is connected, respectively.

In the embodiment of FIG. 3, the connector part 130 may be provided to each of the first side surface 110a, the second side surface 110b, the third side surface 110c, and the fourth side surface 110d of the body part 110.

The pressure measuring part 120 may be configured to be coupled to the upper surface of the body part 110.

Preferably, the upper surface of the body part 110 may be configured in a plate shape so that the pressure measuring part 120 may be seated thereon. That is, the pressure measuring part 120 may be seated on and fixedly coupled to the upper surface of the body part 110.

In addition, the pressure measuring part 120 may include a pressure measuring element 121 and a cap 122. In the embodiment of FIG. 3, the pressure measuring element 121 may be coupled to the upper surface of the body part 110, and the cap 122 may be coupled to the upper portion of the pressure measuring element 121. For example, the pressure measuring element 121 may be a load cell capable of measuring pressure, and the cap 122 may be coupled to an upper portion of the load cell.

The pressure measuring part 120 may be configured to measure the pressure applied toward the upper surface of the body part 110 from the outside.

Specifically, the pressure measuring part 120 may be configured to measure the pressure applied at the upper side of the pressure measuring part 120 toward the upper surface of the body part 110. For example, in the embodiment of FIG. 3, the pressure measuring part 120 may measure the pressure applied to the cap 122 at the upper side of the pressure measuring part 120 toward the body part 110.

The control part 140 may be connected to the pressure measuring part 120 and configured to receive a measured pressure value from the pressure measuring part 120.

The control part 140 may be provided inside or outside the pressure measuring unit 100, and may be connected to communicate with the pressure measuring part 120. Preferably, the control part 140 may be provided inside the body part 110.

The control part 140 may be configured to output the received pressure value to the connected communication line CL. Here, the communication line CL may be connected to the communication terminal 131 provided in the connector part 130.

For example, when a separate processing module is connected to the communication terminal 131 of the connector part 130, the processing module may receive the pressure value output to the communication line CL by the control part 140. Here, since the connector part 130 may be provided to each of the plurality of side surfaces of the body part 110, a plurality of processing modules may be connected to one pressure measuring unit 100. In addition, a plurality of pressure measuring units 100 may be connected to each other through the connection between the connector parts 120. In this case, the plurality of communication lines CL included in the plurality of pressure measuring units 100 may form one communication bus, and the plurality of power lines PL may form one power bus.

That is, the pressure measuring unit 100 according to an embodiment of the present disclosure may be regarded as a unit module for measuring the pressure applied from the outside. Accordingly, since a plurality of pressure measuring units 100 may be coupled with each other to form one pressure measuring device (e.g., a pressure measuring pad), the pressure measuring unit 100 according to an embodiment of the present disclosure has an advantage of providing excellent scalability. For example, when 12 pressure measuring units 100 are provided, the plurality of pressure measuring units 100 may be connected in the form of 1 column and 12 rows, 2 columns and 6 rows, or 3 columns and 4 rows. In addition, the plurality of pressure measuring units 100 may also be connected in the form of 12 columns and 1 row, 6 columns and 2 rows, or 4 columns and 3 rows to be symmetrical thereto.

Meanwhile, the control part 140 provided to the pressure measuring unit 100 according to an embodiment of the present disclosure may selectively include processors 500, application-specific integrated circuit (ASIC), other chipsets, logic circuits, registers, communication modems, data processing devices, and the like, known in the art to execute various control logic performed in the present disclosure. Also, when the control logic is implemented in software, the control part 140 may be implemented as a set of program modules. At this time, the program module may be stored in a memory and executed by the control part 140. The memory may be positioned inside or out of the control part 140 and may be connected to the control part 140 by various well-known means.

Figure 4:
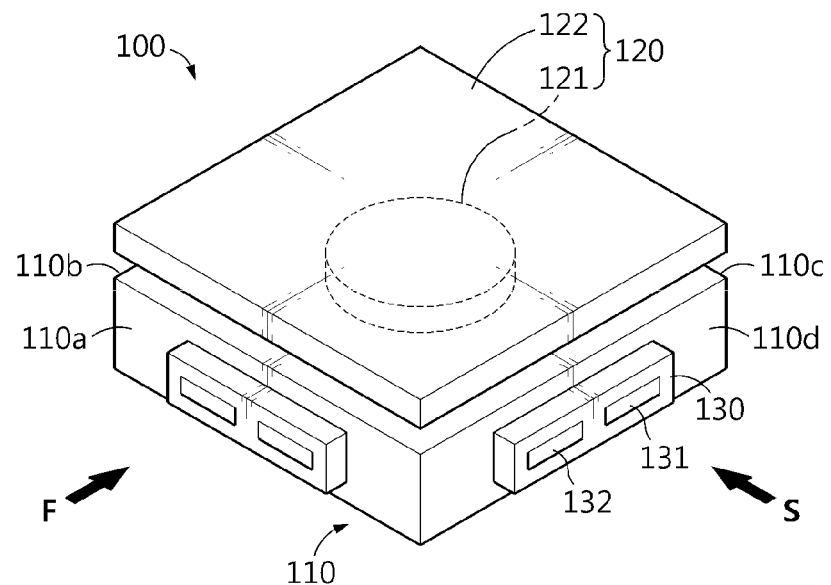
FIG. 4 is a diagram schematically showing another exemplary configuration of the pressure measuring unit according to an embodiment of the present disclosure.
Figure 5:
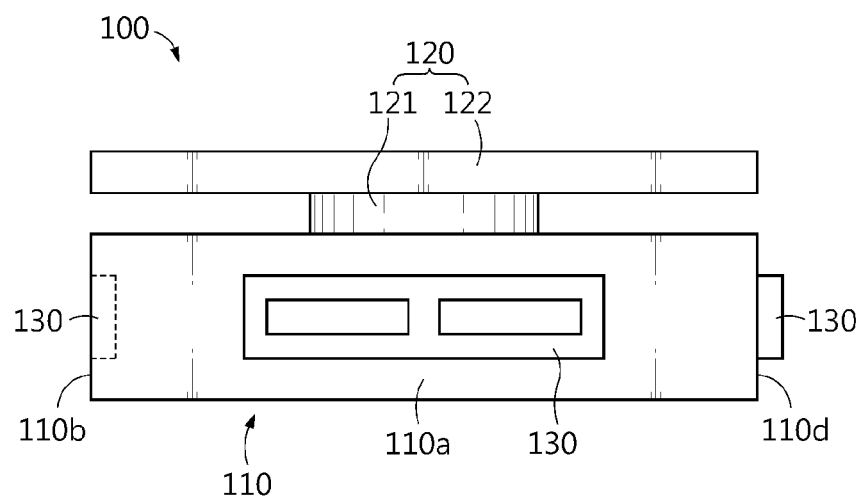
FIG. 5 is a side view schematically showing the pressure measuring unit according to an embodiment of FIG. 4 in an F direction.
Figure 6:
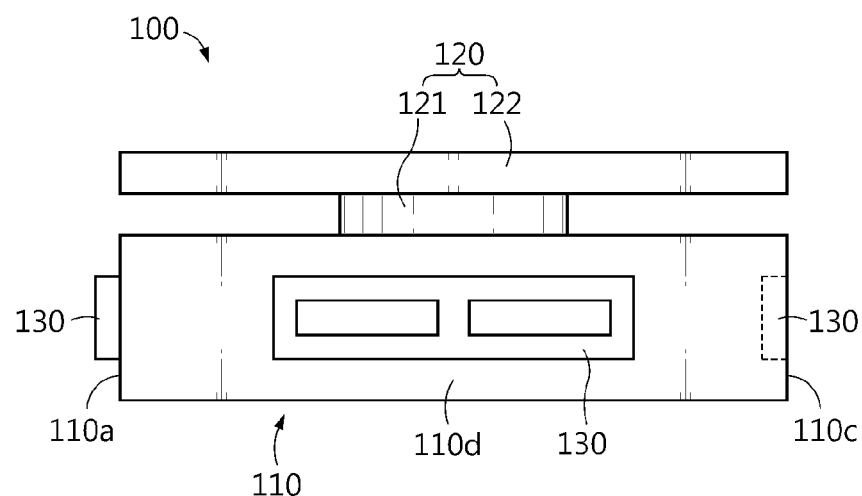
FIG. 6 is a side view schematically showing the pressure measuring unit according to an embodiment of FIG. 4 in an S direction.

FIG. 4 is a diagram schematically showing another exemplary configuration of the pressure measuring unit 100 according to an embodiment of the present disclosure. FIG. 5 is a side view schematically showing the pressure measuring unit 100 according to an embodiment of FIG. 4 in an F direction. FIG. 6 is a side view schematically showing the pressure measuring unit 100 according to an embodiment of FIG. 4 in an S direction.

Some of the plurality of connector parts 120 included in the pressure measuring unit 100 may be configured to be convex to the outside of the body part 110 rather than the corresponding side surface of the body part 110. In addition, the remaining connector part 130 may be configured to be concave toward the inside of the body part 110 rather than the corresponding side surface of the body part 110.

Specifically, any one of the plurality of connector parts 120 provided to the side surfaces facing each other among the plurality of side surfaces of the body part 110 may be configured to convexly protrude to the outside with respect to the side surface of the body part 110. In addition, the remaining connector part 130 may be configured to be concavely recessed toward the inside with respect to the side surface of the body part 110. Here, the shapes of the body part 110 protruding convexly toward the outside and the shape of the body part 110 recessed toward the inside may correspond to each other.

For example, in the embodiments of FIGS. 5 and 6, the connector part 130 provided to the first side surface 110*a* may be configured to protrude to the outside of the body part 110 rather than the first side surface 110*a*, and the connector part 130 provided to the second side surface 110*b* may be configured to protrude to the outside of the body part 110 rather than the second side surface 110*b*. In addition, the connector part 130 provided to the third side surface 110*c* may be configured to be concave toward the inside of the body part 110 rather than the third side surface 110*c*, and the connector part 130 provided to the fourth side surface 110*d* may be configured to be concave toward the inside of the body part 110 rather than the fourth side surface 110*d*.

Figure 7:
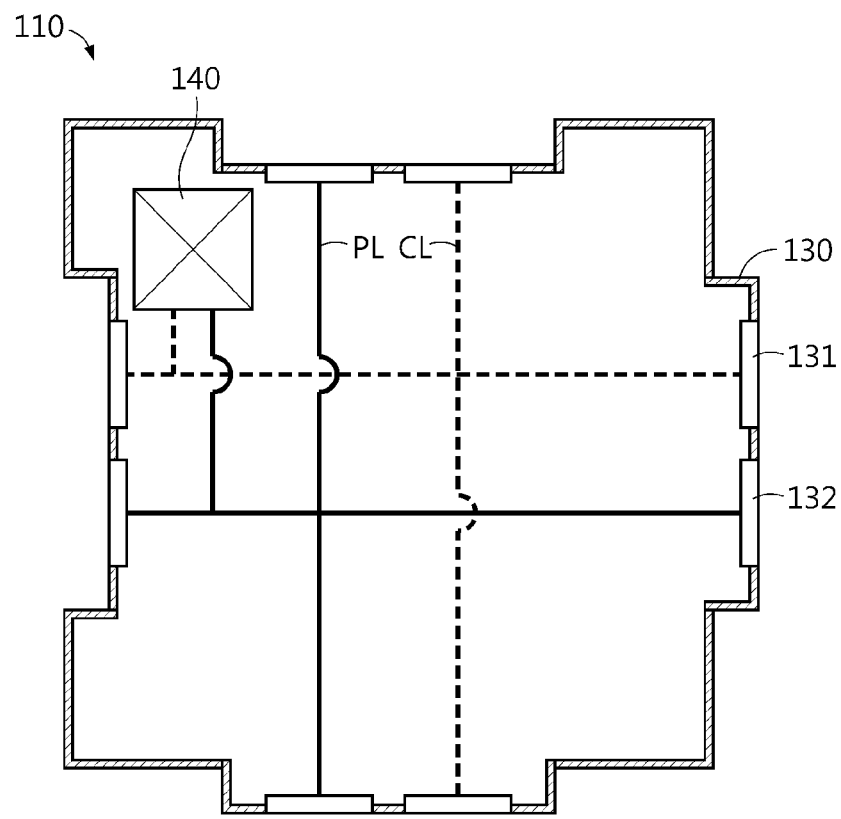
FIG. 7 is a plan view schematically showing the inside of a body part, in the pressure measuring unit according to an embodiment of the present disclosure.

FIG. 7 is a plan view schematically showing the inside of the body part 110, in the pressure measuring unit 100 according to an embodiment of the present disclosure.

The connector part 130 may be configured to include a power terminal 132 configured to be connected to the power line PL through which a current supplied to the pressure measuring part 120 and the control part 140 flows and a communication terminal 131 configured to be connected to the communication line CL.

Specifically, the power line PL is a line that is connected to the power terminal 132, the pressure measuring part 120 and the control part 140, and through which the power introduced from the power terminal 132 is transmitted to the pressure measuring part 120 and the control part 140. The communication line CL is a line that is connected to the communication terminal 131 and the control part 140, and through which the pressure value output by the control part 140 is transmitted to the communication terminal 131. Here, the pressure measuring part 120 and the control part 140 may be connected through a separate line different from the communication line CL, so that the pressure value measured by the pressure measuring part 120 may be transmitted to the control part 140.

Specifically, the connector part 130 may be provided to each of the plurality of side surfaces of the body part 110, and the power terminals 132 respectively included in the connector parts 120 may be configured to be connected to each other through the power line PL. In addition, the connector parts 120 may be configured such that the communication terminals 131 respectively included in the connector parts 120 are connected to each other through the communication line CL.

For example, in the embodiment of FIG. 7, each of four connector parts 120 respectively provided to four side surfaces 110*a*, 110*b*, 110*c*, 110*d* of the body part 110 may include a power terminal 132 and a communication terminal 131. The power terminals 132 of the four connector parts 120 may be connected to each other through the power line PL, and a part of the power line PL may be branched to be connected to the pressure measuring part 120 and the control part 140. In addition, the communication terminals 131 of the four connector parts 120 may be connected to each other through the communication line CL, and a part of the communication line CL may be branched to be connected to the control part 140.

That is, referring to FIG. 7, when a plurality of pressure measuring units 100 are provided, different pressure measuring units 100 are connected to the first side surface 110*a*, the second side surface 110*b*, the third side surface 110*c*, and the fourth side surface 110*d* of one pressure measuring unit 100, respectively. In addition, the communication lines CL included in the five connected pressure measuring units 100 may form one communication bus, and the power lines PL may form one power bus.

The control part 140 may be configured to output the pressure value to the communication line CL together with a pre-allocated identification number. Here, the identification number may be an identification number that is allocated in advance for the pressure measuring unit 100.

For example, when generating a communication packet to be output to the communication line CL, the control part 140 may include the pre-allocated identification number in a header area of the communication packet and include the pressure value in a data area of the communication packet.

It is assumed that a plurality of pressure measuring units 100 are connected to one receiver. In this case, if the communication packet does not include an identification number capable of specifying the pressure measuring unit 100, there is a problem that the receiver cannot specify which pressure measuring unit 100 has received the communication packet among the plurality of pressure measuring units 100. Accordingly, as the control part 140 includes the pre-allocated identification number in the header area of the communication packet, it is possible to specify the pressure measuring unit 100 corresponding to the received communication packet among the plurality of pressure measuring units 100 by reading the identification number included in the header area of the received communication packet received by the receiver.

Figure 8:
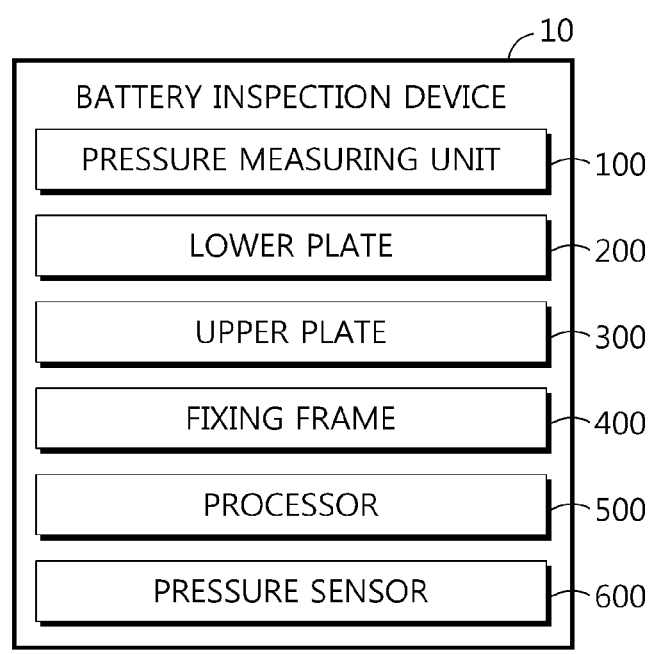
FIG. 8 is a diagram schematically showing a battery inspection device according to another embodiment of the present disclosure.
Figure 9:
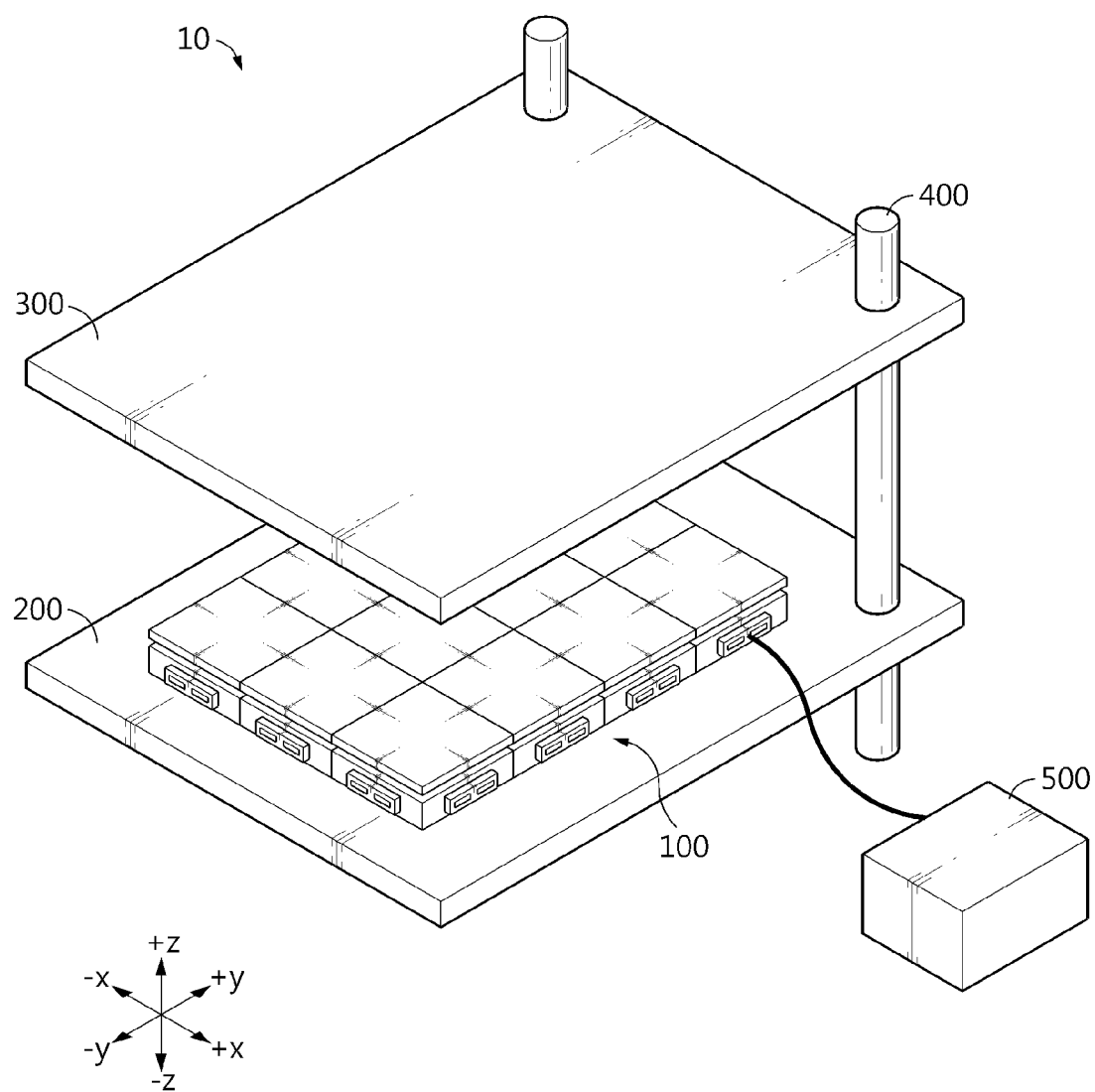
FIG. 9 is a diagram schematically showing an exemplary configuration of the battery inspection device according to another embodiment of the present disclosure.

FIG. 8 is a diagram schematically showing a battery inspection device 10 according to another embodiment of the present disclosure. FIG. 9 is a diagram schematically showing an exemplary configuration of the battery inspection device 10 according to another embodiment of the present disclosure.

Referring to FIG. 8, the battery inspection device 10 may include the pressure measuring unit 100 according to an embodiment of the present disclosure. That is, the battery inspection device 10 may include the pressure measuring unit 100 described above with reference to FIGS. 1 to 7.

In addition, the battery inspection device 10 may include a lower plate 200, an upper plate 300, and a fixing frame 400.

Here, the battery 20 means one physically separable independent cell including a negative electrode terminal 23*a* and a positive electrode terminal 23*c*. For example, one pouch-type lithium polymer cell may be regarded as the battery 20. Also, the battery 20 may be a battery module in which one or more battery cells are connected in series and/or in parallel. Hereinafter, for convenience of explanation, it is assumed that the battery 20 is an independent cell.

The lower plate 200 may be configured in a plate shape.

The upper plate 300 may be configured in a plate shape and may be configured to face the lower plate 200.

For example, in the embodiment of FIG. 9, both the lower plate 200 and the upper plate 300 may be configured in a plate shape and may be positioned to face each other.

The fixing frame 400 may be configured such that a portion of the upper plate 300 and a portion of the lower plate 200 are fixedly coupled. That is, the fixing frame 400 may fix a portion of the upper plate 300 and a portion of the lower plate 200 so that the upper plate 300 and the lower plate 200 are positioned to be spaced apart.

For example, in the embodiment of FIG. 9, the fixing frame 400 may be coupled to both the upper plate 300 and the lower plate 200, so that the upper plate 300 and the lower plate 200 may be positioned to face each other.

The pressure measuring unit 100 may be configured to be provided in plurality on the upper surface of the lower plate 200.

As described above, the pressure measuring unit 100 may include a body part 110 and a connector part 130 provided to a plurality of side surfaces of the body part 110. The plurality of pressure measuring units 100 may be configured such that the corresponding connector parts 120 are connected to each other, and may be coupled to the upper surface of the lower plate 200. Preferably, in the plurality of pressure measuring units 100, the lower surface of the body part 110 may be fixed to the upper surface of the lower plate 200.

For example, in the embodiment of FIG. 9, the pressure measuring unit 100 according to the embodiment of FIG. 4 may be provided in plurality. In addition, the plurality of pressure measuring units 100 may be connected to each other in 3 columns and 4 rows based on the x-y direction, and may be provided to the upper surface of the lower plate 200.

In addition, the pressure measuring unit 100 may be configured to include the pressure measuring part 120 having an upper surface configured in a plate shape so that the battery 20 may be seated on the plurality of pressure measuring units 100.

That is, the upper surface of the pressure measuring part 120 may be configured in a plate shape so that the battery 20 may be seated.

Figure 10:
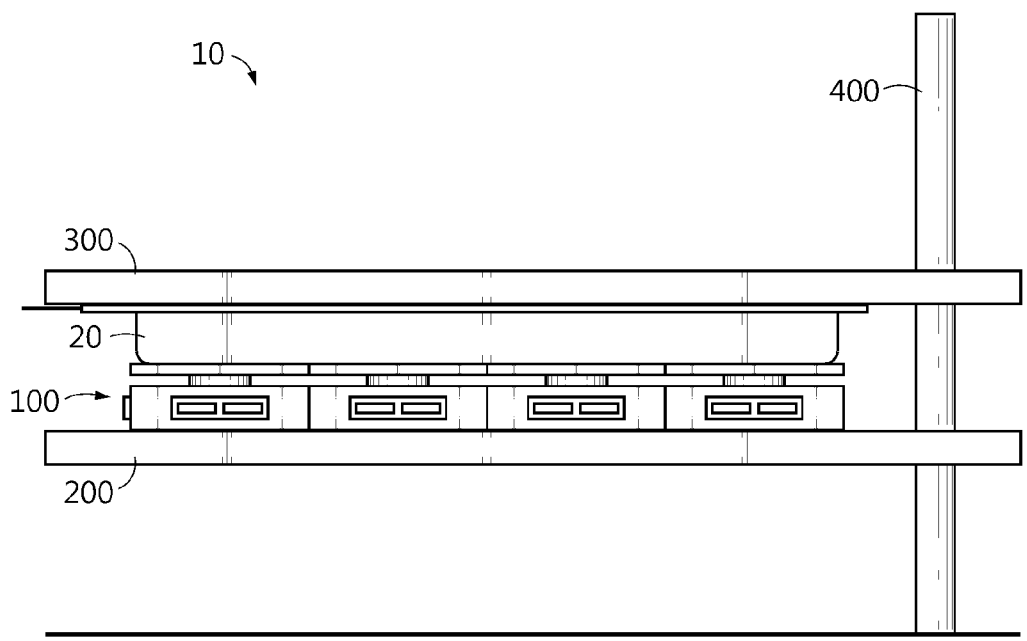
FIG. 10 is a diagram schematically showing an exemplary configuration in which a battery is interposed in the battery inspection device according to another embodiment of the present disclosure.

FIG. 10 is a diagram schematically showing an exemplary configuration in which a battery 20 is interposed in the battery inspection device 10 according to another embodiment of the present disclosure. Specifically, FIG. 10 is an embodiment in which a battery 20 is further included in the embodiment of FIG. 9.

For example, in the embodiment of FIG. 10, the battery 20 may be interposed between the upper plate 300 and the upper portion of the plurality of pressure measuring units 100. Specifically, the battery 20 may be interposed between the upper plate 300 and the upper surface of the pressure measuring parts 130 of the plurality of pressure measuring units 100. Preferably, the upper surface of the pressure measuring part 120 may be configured in a plate shape so that the battery 20 may be seated.

In addition, the pressure measuring unit 100 may be configured to measure a unit pressure value applied toward the lower plate 200.

Specifically, during the charging and/or discharging of the battery 20, each of the plurality of pressure measuring units 100 may measure a unit pressure value applied toward the lower plate 200 from a portion of the corresponding battery 20. More specifically, the plurality of pressure measuring units 100 may measure the unit pressure value applied toward the lower plate 200 from the portion of the battery 20 in contact with the upper surface of the pressure measuring part 120 provided to each of the plurality of pressure measuring units 100.

For example, referring to FIGS. 9 and 10, each of 12 pressure measuring units 100 provided to the upper surface of the lower plate 200 may measure a unit pressure value applied toward the lower plate 200 from a portion of the battery 20 in contact with the upper surface of the pressure measuring part 120.

Referring to FIG. 9, the battery inspection device 10 may further include a processor 500.

The processor 500 may be configured to be connected to the communication line CL.

Figure 11:
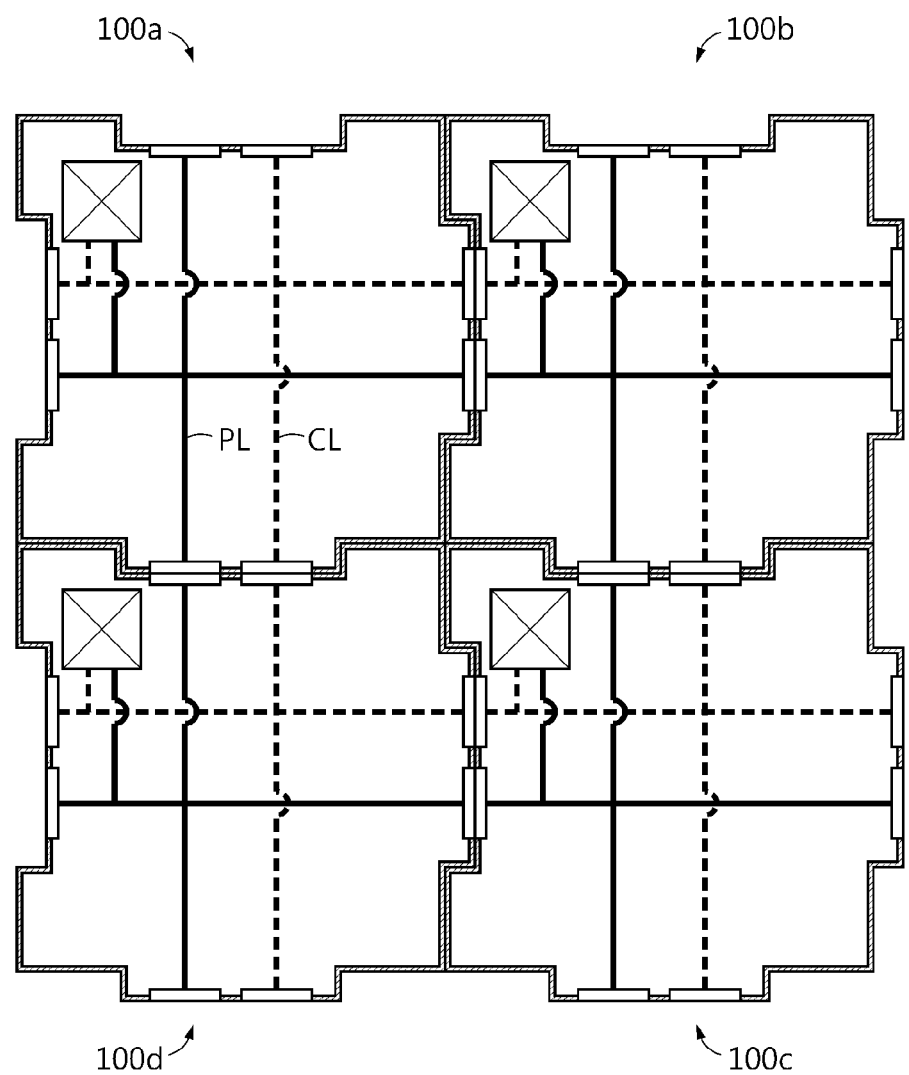
FIG. 11 is a diagram schematically showing an exemplary configuration in which a plurality of pressure measuring units are connected to each other, in the battery inspection device according to another embodiment of the present disclosure.

FIG. 11 is a diagram schematically showing an exemplary configuration in which a plurality of pressure measuring units 100 are connected to each other, in the battery inspection device 10 according to another embodiment of the present disclosure. Specifically, FIG. 11 is an embodiment in which the plurality of pressure measuring units 100 according to the embodiment of FIG. 4 are connected to each other.

For example, in the embodiment of FIG. 11, the first pressure measuring unit 100*a*, the second pressure measuring unit 100*b*, the third pressure measuring unit 100*c*, and the fourth pressure measuring unit 100*d* may be configured such that connector parts 120 having corresponding shapes are connected to each other. That is, the plurality of pressure measuring units 100 may be configured such that the connector parts 120 corresponding to each other are connected to each other.

For example, the connector part 130 of the first pressure measuring unit 100*a* having a convex shape toward the outside of the body part 110 may be connected to the connector parts 120 of the second pressure measuring unit 100*b* and the fourth pressure measuring unit 100*d* having a concave shape toward the inside of the body part 110. In addition, the connector part 130 of the second pressure measuring unit 100*b* having a convex shape toward the outside of the body part 110 may be connected to the connector part 130 of the third pressure measuring unit 100*c* having a concave shape toward the inside of the body part 110. Also, the connector part 130 of the fourth pressure measuring unit 100d having a convex shape toward the outside of the body part 110 may be connected to the connector part 130 of the third pressure measuring unit 100c having a concave shape toward the inside of the body part 110.

For example, in the embodiment of FIG. 11, when the corresponding connector parts 120 of the plurality of pressure measuring units 100 are connected to each other, the communication lines CL included in the plurality of pressure measuring units 100 may form one communication bus. In addition, the power lines PL included in the plurality of pressure measuring units 100 may form one power bus. In addition, the processor 500 may be connected to the communication terminal 131 of any one of the plurality of pressure measuring units 100, thereby being connected to the communication line CL of the plurality of pressure measuring units 100.

For example, in the embodiment of FIG. 9, the processor 500 may be connected to the connector part 130 of the pressure measuring unit 100 located in the first row and the third column based on the x-y direction. In addition, the processor 500 may be connected to the communication lines CL included in the 12 pressure measuring units 100 by being connected to the corresponding connector part 130.

In addition, the processor 500 may be configured to receive a plurality of unit pressure values respectively measured by the plurality of pressure measuring units 100 through the communication line CL.

Specifically, the control parts 140 included in the plurality of pressure measuring units 100 may be connected in parallel through the communication line CL. Accordingly, the processor 500 may receive the pressure value output by each of the plurality of control parts 140 through the communication line CL.

Preferably, the control part 140 may output a communication packet including a pre-allocated identification number and the pressure value to the communication line CL. Accordingly, the processor 500 may extract the identification number and the unit pressure value from the communication packet received through the communication line CL. The processor 500 may determine the pressure measuring unit 100 that has outputted the corresponding communication packet to the communication line CL among the plurality of pressure measuring units 100, based on the extracted identification number. In addition, the processor 500 may determine that the unit pressure value extracted from the communication packet is measured by the determined pressure measuring unit 100.

Also, the processor 500 may be configured to determine at least one of a pressure distribution of the battery 20 and a pressure size for each portion of the battery 20 based on the plurality of received unit pressure values. To this end, the processor 500 may secure in advance position information of each of the plurality of pressure measuring units 100 on the upper surface of the lower plate 200. Such location information may be input to the processor 500 from the outside or may be directly set in the processor 500 by a user.

In general, during the charging and/or discharging of the battery 20, battery swelling in which the volume of the battery 20 increases may occur. This battery swelling may occur not only in a central portion of the battery 20 but also in a peripheral portion thereof. In addition, the peripheral portion of the battery 20 refers to an area excluding the central portion.

That is, the processor 500 may determine which portion of the battery 20 corresponds to each of the plurality of pressure measuring units 100, based on a coupling relationship of the plurality of pressure measuring units 100. Accordingly, the processor 500 may determine at least one of a pressure distribution and a pressure size according to swelling for each portion of the battery 20, based on the unit pressure values received from the plurality of pressure measuring units 100.

Since the battery inspection device 10 may inspect the pressure distribution (swelling distribution) of the battery 20 by battery swelling and/or the pressure size (swelling pressure) of the battery 20 by swelling, it is possible to concretely specify a portion where the swelling has occurred in the battery 20.

In addition, since the battery inspection device 10 may specifically determine the pressure size for each portion of the battery 20, there is an advantage of providing information for analyzing the specific cause of the swelling of the battery 20. For example, based on the pressure distribution of the battery 20 and the pressure size for each portion, obtained from the battery inspection device 10, it is possible to distinguish whether the cause of the battery swelling is a pressure increase caused by gas generation or a pressure increase caused by the introduction of foreign substances.

Therefore, the battery inspection device 10 may diagnose battery swelling in various aspects by determining the pressure distribution of the battery 20 and/or the pressure size of the battery 20 due to the battery swelling.

Meanwhile, the fixing frame 400 may be configured to adjust a gap between the lower plate 200 and the upper plate 300. Preferably, a position at which the lower plate 200 and the upper plate 300 are fixedly coupled to the fixing frame 400 may be adjusted so that the battery 20 may be fixed between the plurality of pressure measuring units 100 and the upper plate 300. Accordingly, the distance between the upper surface of the plurality of pressure measuring units 100 and the lower surface of the upper plate 300 may be adjusted.

For example, in the embodiment of FIG. 9, the fixing frame 400 may be configured to adjust the positions at which the lower plate 200 and the upper plate 300 are fixed in the vertical direction (z direction).

If the distance between the upper surface of the lower plate 200 and the lower surface of the upper plate 300 cannot be adjusted by the fixing frame 400, there is a problem in that the size and type of the battery 20 to be inspected is limited.

Therefore, since the battery inspection device 10 according to an embodiment of the present disclosure includes the fixing frame 400 configured to adjust the gap between the lower plate 200 and the upper plate 300, there is an advantage of capable of inspecting swelling of batteries 20 having various thicknesses.

Figure 12:
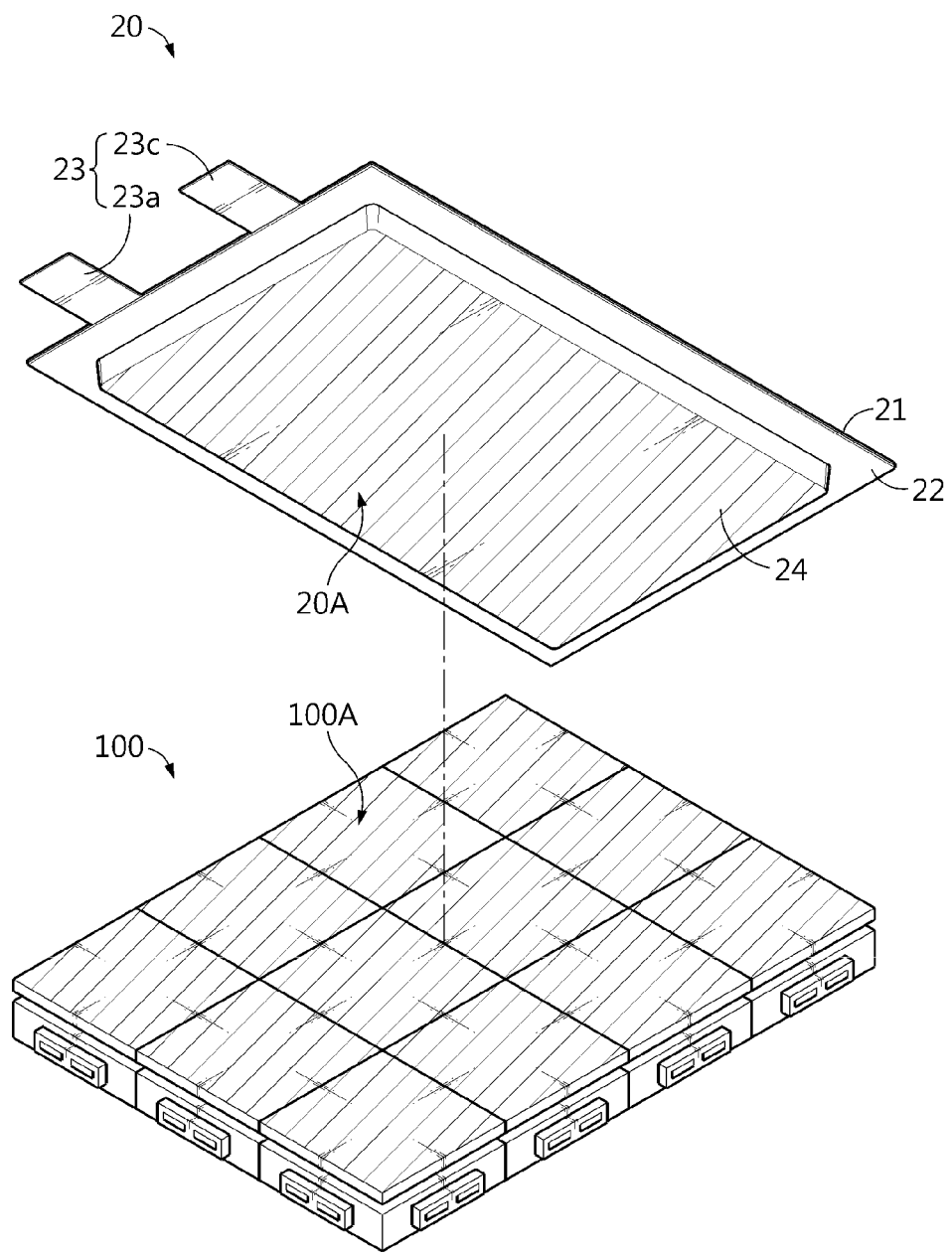
FIG. 12 is a diagram schematically showing a battery, which is an inspection target of the battery inspection device according to another embodiment of the present disclosure, and the plurality of pressure measuring units.

FIG. 12 is a diagram schematically showing a battery 20, which is an inspection target of the battery inspection device 10 according to another embodiment of the present disclosure, and the plurality of pressure measuring units 100.

Referring to FIG. 12, the battery 20 may include an upper case 21, a lower case 22, an electrode terminal 23, and an accommodation portion 24. Here, the electrode terminal 23 may include a positive electrode terminal 23c and a negative electrode terminal 23a. In addition, an electrode assembly including a positive electrode, a negative electrode, and a separator may be accommodated in the accommodation portion 24 of the battery 20.

In addition, an upper surface of the upper case 21 of the battery 20 may be in contact with the lower surface of the upper plate 300, and a lower surface of the accommodation portion 24 of the battery 20 may be in contact with the upper surface of the plurality of pressure measuring units 100. Although the battery 20 having the accommodation portion 24 is shown only in the lower case 22 in FIG. 12, it should be noted that the battery 20 having the accommodation portion 24 in the upper case 21 and/or the lower case 22 may also be applied as an inspection target of the battery inspection device 10.

Preferably, the number of the plurality of pressure measuring units 100 may be selected such that the total area 100a of the upper surfaces of the plurality of pressure measuring units 100 is greater than or equal to the area 20A of the lower surface of the accommodation portion 24 of the battery 20 in contact therewith.

For example, in the embodiment of FIG. 12, 12 pressure measuring units 100 may be connected to each other. In addition, the total area 100a of the upper surfaces of the pressure measuring parts 130 of the 12 pressure measuring units 100 may be greater than or equal to the area 20A of the lower surface of the accommodation portion 24 of the battery 20.

Referring to FIG. 1, the pressure measuring unit 100 may further include a coupling part 150.

That is, the plurality of pressure measuring units 100 may further include a coupling part 150 installed at the plurality of side surfaces of the body part 110 to be detachable from each other.

For example, the coupling part 150 may be further included in the pressure measuring unit 100 according to the embodiment of FIGS. 3 and 4.

Specifically, the coupling part 150 may be installed at the side surface of the body part 110 of each of the pressure measuring units 100. In addition, the coupling parts 150 provided to the corresponding pressure measuring unit 100 may be detachably attached to each other, so that the plurality of corresponding pressure measuring units 100 may be coupled to each other. In addition, the plurality of pressure measuring units 100 may be coupled by the coupling part 150, so that the corresponding connector parts 120 may be connected to each other.

If the plurality of pressure measuring units 100 are connected only by the connector part 130, when an external force is applied or battery pressure is applied, the connection between the connector parts 120 may be abnormally disconnected. Accordingly, the plurality of pressure measuring units 100 may further include the coupling part 150 at the side surface of the body part 110 to improve the connection strength between the corresponding pressure measuring units 100.

More specifically, the plurality of pressure measuring units 100 may be configured to include the connector part 130 and the body part 110 configured in a cuboid shape to include the coupling part 150 at each of the plurality of side surfaces, respectively. For example, the body part 110 may include one upper surface, one lower surface, and four side surfaces 110a, 110b, 110c, 110d, and the coupling part 150 and connector part 130 may be provided to each of the four side surfaces 110a, 110b, 110c, 110d.

In addition, the plurality of pressure measuring units 100 may be configured such that the corresponding pressure measuring units 100 are detachably attached through the coupling part 150. Accordingly, the plurality of pressure measuring units 100 may be configured such that the connector parts 120 of the corresponding pressure measuring units 100 are connected to each other.

Referring to FIG. 11, the communication lines CL respectively included in the pressure measuring units 100 connected to each other may form one communication bus. Accordingly, the plurality of control parts 140 included in the pressure measuring units 100 connected to each other may be connected in parallel. In addition, the power lines PL respectively included in the pressure measuring units 100 connected to each other may form one power bus.

Hereinafter, for convenience of description, an embodiment in which the coupling part 150 is further included in the pressure measuring unit 100 according to the embodiment of FIG. 4 will be described. However, it should be noted that the coupling part 150 may be provided to the pressure measuring unit 100 according to the embodiment of FIGS. 3 and 4.

For example, the coupling part 150 may be formed of a magnetic material and may be attached to some or all of the corresponding side surfaces of the body part 110. As another example, the coupling part 150 may be a coating layer formed by being directly applied to some or all of the corresponding side surfaces of the body part 110.

Figure 13:
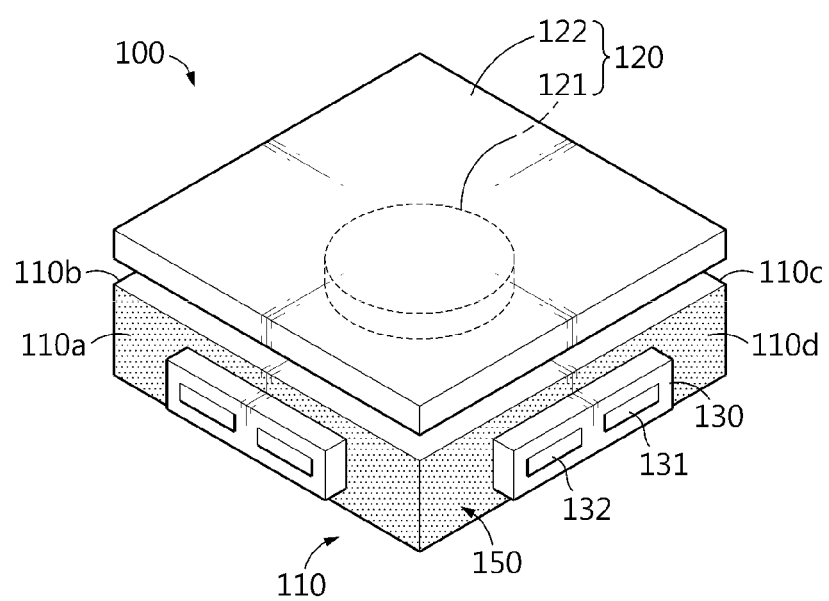
FIG. 13 is a diagram schematically showing still another embodiment of the pressure measuring unit according to an embodiment of the present disclosure.

FIG. 13 is a diagram schematically showing still another embodiment of the pressure measuring unit 100 according to an embodiment of the present disclosure.

For example, in the embodiment of FIG. 13, the coupling part 150 may be attached to all of the corresponding side surfaces of the body part 110.

When the plurality of pressure measuring units 100 are connected to each other, the strength of the connection between the plurality of pressure measuring units 100 may be improved by the attractive force between the coupling parts 150 of the corresponding pressure measuring units 100. Therefore, the battery inspection device 10 according to an embodiment of the present disclosure has an advantage of more stably maintaining the connection between the connector parts 120 of the corresponding pressure measuring units 100.

Figure 14:
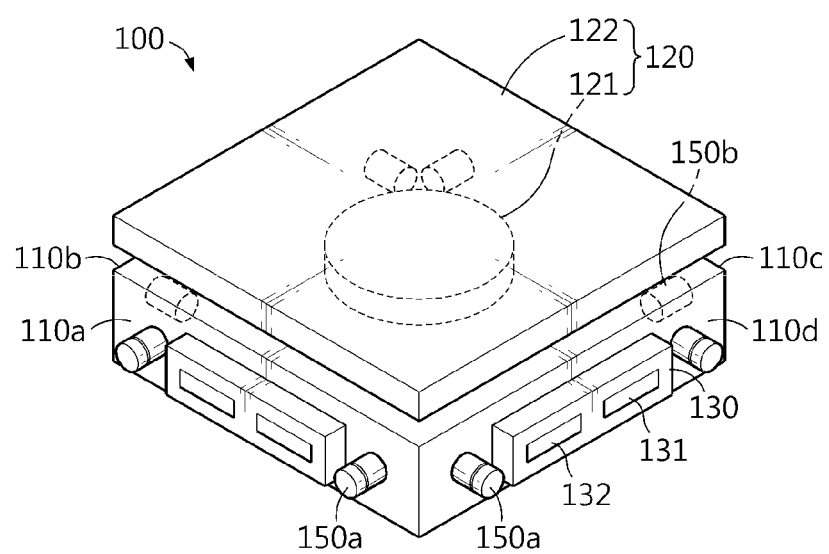
FIG. 14 is a diagram schematically showing still another embodiment of the pressure measuring unit according to an embodiment of the present disclosure.

FIG. 14 is a diagram schematically showing still another embodiment of the pressure measuring unit 100 according to an embodiment of the present disclosure.

In the embodiment of FIG. 14, the coupling part 150 may include a first connection portion 150a configured in a convex shape toward the outside of the body part 110 and a second connection portion 150b configured in a concave shape toward the inside of the body part 110. For example, the first connection portion 150a and the second connection portion 150b are configured to correspond to each other, so that the first connection portion 150a of the pressure measuring unit 100 may be fitted into and coupled to the second connection portion 150b of another pressure measuring unit 100.

That is, the first connection portion 150a may be a protrusion in the form of protruding toward the outside of the body part 110, and the second connection portion 150b may be a groove in the form of being depressed toward the inside of the body part 110.

Specifically, the first connection portion 150a may be configured to protrude outward with respect to the corresponding side surface of the body part 110. Preferably, the first connection portion 150a may be provided to a side surface having the connector part 130 convexly protruding outward rather than the side surface of the body part 110 among the plurality of side surfaces of the body part 110. For example, in the embodiment of FIG. 14, the first connection portion 150a may be provided to the first side surface 110a and the fourth side surface 110d, and the second connection portion 150b may be provided to the second side surface 110b and the third side surface 110c.

Also, the protrusion length of the first connection portion 150a may be greater than or equal to the protrusion length of the connector part 130. Specifically, the first connection portion 150a may be configured such that the length thereof from the side surface of the corresponding body part 110 to one end is greater than or equal to the length from the side surface of the corresponding body part 110 to one end of an adjacent connector part 130. For example, in the embodiment of FIG. 14, the length from the fourth side surface 110d to one end of the first connection portion 150a may be greater than or equal to the length from the fourth side surface 110d to one end of the connector part 130.

The depression length of the second connection portion 150b may be configured to correspond to the protrusion length of the first connection portion 150a. Specifically, the depression length of each of the plurality of second connection portions 150b may be greater than or equal to the depression length of the corresponding connector part 130. Here, the protrusion length may mean a length formed in an outwardly convex shape with respect to the corresponding side surface of the body part 110. In addition, the depression length may mean a length formed in an inwardly concave shape with respect to the corresponding side surface of the body part 110.

Therefore, when the plurality of pressure measuring units 100 are connected to each other, the first connection portion 150a and the second connection portion 150b corresponding to each other are coupled, so that it is possible to effectively prevent the connection between the connector parts 120 of the plurality of connected pressure measuring units 100 from being abnormally released due to an external shock or swelling pressure applied from the battery 20.

Figure 15:
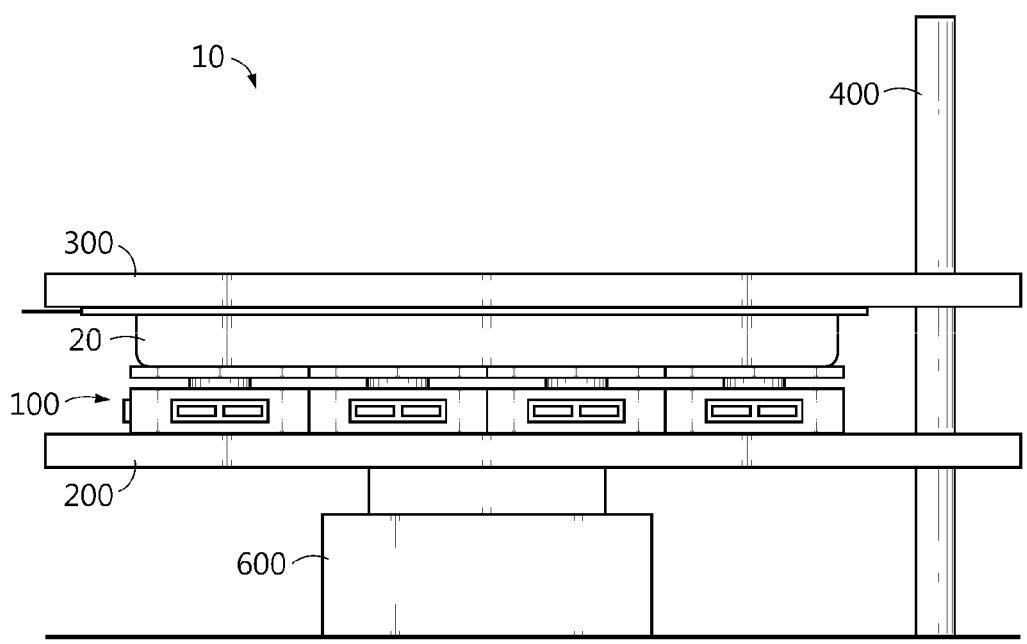
FIG. 15 is a diagram schematically showing another exemplary configuration of the battery inspection device according to another embodiment of the present disclosure.

FIG. 15 is a diagram schematically showing another exemplary configuration of the battery inspection device 10 according to another embodiment of the present disclosure.

Referring to FIGS. 8 and 15, the battery inspection device 10 may further include a pressure sensor 600.

The pressure sensor 600 may be configured to be positioned below the lower plate 200. Preferably, the upper surface of the pressure sensor 600 may be in contact with the lower surface of the lower plate 200.

In addition, the pressure sensor 600 may be configured to measure a battery pressure value applied from the battery 20 toward the lower plate 200.

Specifically, each of the plurality of pressure measuring units 100 provided to the upper surface of the lower plate 200 may measure a unit pressure value for a corresponding portion of the battery 20. Meanwhile, the pressure sensor 600 may measure the total pressure value (the battery pressure value) applied from the battery 20 toward the lower plate 200.

If the sum of the plurality of unit pressure values received from the plurality of pressure measuring units 100 is different from the battery pressure value, the processor 500 may be configured to correct each of the plurality of unit pressure values based on the battery pressure value.

Ideally, the sum of the unit pressure values respectively measured by the plurality of pressure measuring units 100 may be equal to the battery pressure value measured by the pressure sensor 600. However, since the battery 20 is configured to have one accommodation portion 24, considering the case where the battery swelling occurring in a part of the accommodation portion 24 of the battery 20 may affect other parts and/or the case where friction loss is generated due to the mechanical coupling relationship between components of the battery inspection device 10, the sum of the unit pressure values and the battery pressure value may be different.

Accordingly, the processor 500 may more accurately determine the pressure distribution of the battery 20 and/or the pressure size for each portion of the battery 20 by correcting each unit pressure value according to the battery pressure value.

Specifically, the processor 500 may calculate an error rate between the battery pressure value and the sum of the plurality of unit pressure values by calculating the formula "(battery pressure value−sum of the plurality of unit pressure values)÷battery pressure value×100". In addition, the processor 500 may upwardly or downwardly adjust each of the plurality of unit pressure values according to the calculated error rate.

For example, it is assumed that the battery pressure value is P, and the sum of the plurality of unit pressure values is 0.9 P. The processor 500 may calculate the formula "(P−0.9 P)÷P×100" to obtain an error rate of 10% between the battery pressure value and the sum of the plurality of unit pressure values. In addition, the processor 500 may increase each of the plurality of unit pressure values by 10%, and may determine a pressure distribution of the battery 20 and/or a pressure size of each portion of the battery 20 based on the plurality of increased unit pressure values.

A battery manufacturing apparatus according to another embodiment of the present disclosure may include the battery inspection device 10 according to an embodiment of the present disclosure.

For example, the battery manufacturing apparatus may be used in a test process during the manufacturing process of the battery 20. Preferably, the test process may be performed after the aging process of the battery 20 is completed, and may be a process of selecting a defective battery 20 while charging and discharging the battery 20 several times. In this process, the battery 20 may be interposed in the battery inspection device 10, and while charging and discharging of the battery 20 are repeatedly performed, the processor 500 may detect the pressure distribution (swelling distribution) of the battery 20 and the pressure size (swelling pressure) for each portion.

Therefore, according to the battery manufacturing apparatus according to another embodiment of the present disclosure, there is an advantage that a battery 20 with a defect (particularly, a swelling-related defect) may be selected before the battery 20 is shipped.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery inspection device
20: battery

100: pressure measuring unit
110: body part
120: connector part
130: pressure measuring part
140: control part
150: coupling part
200: lower plate
300: upper plate
400: fixing frame
500: processor
600: pressure sensor

What is claimed is:

1. A pressure measuring unit, comprising:
a body part configured to have an upper surface, a lower surface, and a plurality of side surfaces;
a connector part configured to be provided to at least one side surface among the plurality of side surfaces of the body part;
a pressure measuring part coupled to the upper surface of the body part and configured to measure a pressure applied toward the upper surface of the body part from the outside to generate a pressure value; and
a control part connected to the pressure measuring part to receive the measured pressure value from the pressure measuring part and configured to output the received pressure value to a communication line connected thereto,
wherein the connector part is concaved toward an inside of the body part and recedes inward into the body part starting from a corresponding side surface among the plurality of side surfaces of the body part, and
wherein the pressure measuring part includes a pressure measuring element that is coupled to the upper surface of the body part, and a cap coupled to an upper portion of the pressure measuring element.

2. The pressure measuring unit according to claim 1, wherein the connector part is configured to include:
a power terminal configured to be connected to a power line through which a current supplied to the pressure measuring part and the control part flows; and
a communication terminal configured to be connected to the communication line.

3. The pressure measuring unit according to claim 2, wherein the connector part is provided to each of the plurality of side surfaces of the body part,
wherein power terminals respectively included in connector parts are connected to each other through the power line, and communication terminals respectively included in the connector parts are connected to each other through the communication line.

4. The pressure measuring unit according to claim 1, wherein the control part is configured to output the pressure value to the communication line together with a pre-allocated identification number.

5. A battery inspection device, comprising:
the pressure measuring unit according to claim 1;
a lower plate configured in a plate shape;
an upper plate configured in a plate shape and configured to be positioned to face the lower plate; and
a fixing frame configured such that a portion of the upper plate and a portion of the lower plate are fixedly coupled thereto,
wherein the pressure measuring unit is provided in a plurality to an upper surface of the lower plate and includes the pressure measuring part whose upper surface is configured in a plate shape such that a battery is seated on the plurality of pressure measuring units, and the pressure measuring part is configured to measure a unit pressure value applied toward the lower plate.

6. The battery inspection device according to claim 5, wherein the plurality of pressure measuring units are configured such that the connector parts of the pressure measuring units corresponding to each other are connected to each other.

7. The battery inspection device according to claim 5, wherein the plurality of pressure measuring units further include coupling parts installed at the plurality of side surfaces of the body part and configured to be detachably attached to each other.

8. The battery inspection device according to claim 7, wherein the plurality of pressure measuring units respectively include the connector part and the body part configured in a cuboid shape to include the coupling part at each of the plurality of side surfaces thereof,
wherein the plurality of pressure measuring units are configured such that the plurality of pressure measuring units corresponding to each other are detachably attached through the coupling part, and
wherein the plurality of pressure measuring units are configured such that the connector parts of the pressure measuring units corresponding to each other are connected to each other.

9. The battery inspection device according to claim 5, further comprising:
a processor connected to the communication line and configured to receive a plurality of unit pressure values respectively measured by the plurality of pressure measuring units through the communication line and determine at least one of a pressure distribution of the battery and a pressure size of each portion of the battery based on the plurality of received unit pressure values.

10. The battery inspection device according to claim 9, further comprising:
a pressure sensor positioned below the lower plate and configured to measure a battery pressure value applied toward the lower plate from the battery.

11. The battery inspection device according to claim 10, wherein when the sum of the plurality of unit pressure values received from the plurality of pressure measuring units is different from the battery pressure value, the processor is configured to correct each of the plurality of unit pressure values based on the battery pressure value.

12. A battery manufacturing apparatus, comprising the pressure measuring unit according to claim 1.

13. The pressure measuring unit according to claim 1, further comprising another connector part that is convexed toward an outside of the body part with respect to a corresponding side surface among the plurality of side surfaces of the body part.

14. The pressure measuring unit according to claim 1, wherein the pressure measuring element is a load cell configured to measure pressure.

15. A battery inspection device, comprising:
a plurality of pressure measuring unit;
a lower plate configured in a plate shape;
an upper plate configured in a plate shape and configured to be positioned to face the lower plate; and
a fixing frame configured such that a portion of the upper plate and a portion of the lower plate are fixedly coupled thereto,
wherein each pressure measuring unit includes:
a body part configured to have an upper surface, a lower surface, and a plurality of side surfaces;

a connector part configured to be provided to at least one side surface among the plurality of side surfaces of the body part;

a pressure measuring part coupled to the upper surface of the body part and configured to measure a pressure applied toward the upper surface of the body part from the outside to generate a pressure value; and a control part connected to the pressure measuring part to receive the measured pressure value from the pressure measuring part and configured to output the received pressure value to a communication line connected thereto, wherein the plurality of pressure measuring units are provided to an upper surface of the lower plate and includes the pressure measuring part whose upper surface is configured in a plate shape such that a battery is seated on the plurality of pressure measuring units, and the pressure measuring part is configured to measure a unit pressure value applied toward the lower plate, and wherein the plurality of pressure measuring units further include coupling parts installed at the plurality of side surfaces of the body part and configured to be detachably attached to each other.

16. A battery inspection device, comprising:

a plurality of pressure measuring unit;

a lower plate configured in a plate shape;

an upper plate configured in a plate shape and configured to be positioned to face the lower plate;

a fixing frame configured such that a portion of the upper plate and a portion of the lower plate are fixedly coupled thereto;

a processor connected to a communication line and configured to receive a plurality of unit pressure values respectively measured by a plurality of pressure measuring units through the communication line and determine at least one of a pressure distribution of a battery and a pressure size of each portion of the battery based on the plurality of received unit pressure values;

a pressure sensor positioned below the lower plate and configured to measure a battery pressure value applied toward the lower plate from the battery, wherein each pressure measuring unit includes:

a body part configured to have an upper surface, a lower surface, and a plurality of side surfaces;

a connector part configured to be provided to at least one side surface among the plurality of side surfaces of the body part;

a pressure measuring part coupled to the upper surface of the body part and configured to measure a pressure applied toward the upper surface of the body part from the outside to generate a pressure value; and a control part connected to the pressure measuring part to receive the measured pressure value from the pressure measuring part and configured to output the received pressure value to a communication line connected thereto, wherein the plurality of pressure measuring units are provided to an upper surface of the lower plate and includes the pressure measuring part whose upper surface is configured in a plate shape such that a battery is seated on the plurality of pressure measuring units, and the pressure measuring part is configured to measure a unit pressure value applied toward the lower plate, and wherein when the sum of the plurality of unit pressure values received from the plurality of pressure measuring units is different from the battery pressure value, the processor is configured to correct each of the plurality of unit pressure values based on the battery pressure value.

* * * * *